United States Patent [19]

Mezzanotte

[11] Patent Number: 4,770,222

[45] Date of Patent: Sep. 13, 1988

[54] MOTORCYCLE TIRES

[75] Inventor: Mario Mezzanotte, Milan, Italy

[73] Assignee: Societa' Pneumatic Pirelli S.p.A., Italy

[21] Appl. No.: 894,461

[22] Filed: Aug. 11, 1986

Related U.S. Application Data

[63] Continuation of Ser. No. 633,241, Jul. 23, 1984, abandoned.

[30] Foreign Application Priority Data

Jul. 22, 1983 [IT] Italy ................................ 22190 A/83

[51] Int. Cl.$^4$ ................................................ B60C 9/06
[52] U.S. Cl. ..................................... 152/555; 152/557; 152/559
[58] Field of Search ................ 152/526, 535, 548, 555, 152/557, 559, 542, 546, 538, 209 R, 454

[56] References Cited

U.S. PATENT DOCUMENTS

| | | | |
|---|---|---|---|
| 3,397,729 | 8/1968 | Sperberg | 152/557 |
| 3,509,930 | 5/1970 | Mirtain | 152/557 |
| 3,548,910 | 12/1970 | Sperberg | 152/557 |
| 3,717,190 | 2/1973 | Boileau | 152/555 X |
| 3,911,987 | 10/1975 | Takusagawa et al. | 152/330 RF |
| 4,109,696 | 8/1978 | Nakasaki et al. | 152/557 |
| 4,177,852 | 12/1979 | Merli et al. | 152/557 |
| 4,215,735 | 8/1980 | Sato | 152/330 RF |
| 4,257,469 | 3/1981 | Uemura | 152/557 |
| 4,263,955 | 4/1981 | Ikeda | 152/330 RF |
| 4,390,052 | 6/1983 | Mendiola et al. | 152/362 R |

FOREIGN PATENT DOCUMENTS

| | | | |
|---|---|---|---|
| 125426 | 5/1960 | France . | |
| 2380907 | 8/1977 | France . | |
| 58-149805 | 4/1983 | Japan . | |
| 2121736 | 1/1984 | United Kingdom | 152/555 |

*Primary Examiner*—Michael W. Ball
*Assistant Examiner*—Ramon R. Hoch
*Attorney, Agent, or Firm*—Stevens, Davis, Miller & Mosher

[57] ABSTRACT

This invention concerns a tire especially for motorcycles, having a textile carcass that comprises at least one pair of cord plies. Each ply has a plurality of cords. The cords are parallel to each other, crossed with those of the adjacent plies and are symmetrically inclined with respect to the circumferential direction, preferably at an angle between 50° and 65° to the midcircumferential plane, measured on the tire crown zone. The tire also has an annular reinforcing structure between the carcass and the tread, comprising at least one pair of textile cord strips, the cords of said strips being crossed with each other and symmetrically inclined with respect to the circumferential direction, at an angle comprised between 18° and 25°, measured also on the crown of the tire.

8 Claims, 2 Drawing Sheets

MOTORCYCLE TIRES

This is a continuation of application Ser. No. 633,241, filed July 23, 1984, now abandoned.

BACKGROUND OF THE INVENTION

The present invention is directed to tires for vehicle wheels, and more particularly to tires for motorcycles.

These types of tires must have a very special structure for supporting conditions of usage that are quite different from those to which normal motor vehicle tires are subjected. It is enough, for example, to cite the fact that these tires must be capable of traveling at quite high camber angle, normally 40°-45°, but even over 55°, as compared to the maximum values of 3° or 4° for usual motor vehicle tires.

Therefore, this requirement involves, for those tires used on motorcycles, the need for having treads that are comparatively wider, or rather more enveloping, than the treads of motor vehicle tires, and with there being a pronounced curvature in the crown, i.e., a pronounced curvature of the tread at the shoulders that is contrary to what is found in other tires, whose treads are more flattened when built to have a reduction in the section-height/section-width ratio, commonly known as the H/C or aspect ratio.

Moreover, a high stiffness is required in the sidewall for the purpose of supporting the vehicle during cornering with these high camber angles, and for conferring to the tire a greater directional capacity and a lateral stability during straightaway running at a high speed.

All these difficulties are pushed to the extreme in the instance of motorcycle tires for racing on roads or tracts, where their performance is exploited to the maximum limit (camber angle up to 56°), i.e., where the tires are always utilized at the threshold of the critical conditions of usage.

For all these reasons, to date tires for motorcycles have only been able to utilize crossed-ply carcasses, i.e., with pairs of cord plies crossed together, at low angular values (20°-30°) with respect to the circumferential direction, since radial carcasses have proved to be absolutely unsuitable because of their excessive lateral instability in addition to the great flexibility of their sidewalls.

SUMMARY OF THE INVENTION

The applicant has now invented a new carcass structure that can be called "mixed" because, although not responding to the characteristics of the crossed-ply carcass, nor presenting the typical structure of radial carcasses, it nevertheless manages to combine all the advantages as regards the behavior of the radial carcasses and the structural advantages of the cross-ply carcasses, while sensibly improving the performances of this type of tire—particularly when utilized for sports or racing competitions.

Hence, an important object of the present invention is a tire for motorcycle wheels, comprising a textile carcass, a tread band in the crown zone of said carcass, and having a deflection of a value between 0.20 and 0.35. The tire has sidewalls and beds for anchoring of the tire on a corresponding mounting rim, with each bead comprising an annular reinforcing core circumferentially inextensible, said carcass comprising at least a pair of plies with their extremities turned up around said annular reinforcing core, and provided with cords disposed parallel to each other in each ply, and crossed with those of the adjacent plies, characterized by the fact that said cords are symmetrically inclined with respect to the midcircumferential plane at an angle generally between 50° and 65°, measured on the crown, and that a breaker structure is constructed between said carcass and the tread band, and that it comprises at least two strips made of textile cords that are parallel to one another in each strip and crossed with the cords of the adjacent strip. The strips are symmetrically inclined with respect to the circumferential direction at an angle between 18° and 25°, measured on the crown.

According to a first embodiment of the invention, the carcass comprises only a pair of crossed plies, the cords of said crossed plies being respectively of synthetic fibers derived from cellulose in the axially innermost ply, and of aramid, i.e., aromatic polyamide, in the axially outermost ply, while the annular reinforcing structure made with strips of aramid cords comprises a further layer of longitudinally oriented polyamide cords that is disposed radially outwardly of said strips and having substantially the same width.

In particular, quite conveniently, the synthetic fiber cords are of rayon, those of polyamide are of nylon, and those of aramid are of a material that is known on the market as KEVLAR, a registered DuPont trademark. The carcass cords are preferably symmetrically inclined with respect to the circumferential direction at an angle between 55° and 60°.

According to a further preferred form, the carcass is provided with another reinforcing element for the beads, comprising a strip of textile cords flipped up (in a loop) around said annular reinforcing cord, said flipper presenting two legs of differing lengths, extending radially outwardly beyond the extremities of the turn ups of the carcass-plies, the cords of said strips in said legs being symmetrically inclined with respect to the radial direction at an angle of about 45°, that is, between about 40° and 50°.

Quite advantageously, the most extended leg of said flipper is at a radial height between 35% and 65% of the height of the tire sidewall.

The tire structure, with or without said bead reinforcement, can be specialized as needed with the insertion of further reinforcing structural elements.

According to a first variation of the invention, said structure comprises at least one further carcass ply provided with cords, preferably of polyamide, disposed radially and substantially extended from one side to the other of the tire.

According to a further variation, each sidewall of said carcass has an additional layer of elastomeric material having an annular profile and a substantially lenticular cross-section which is inserted between said pair of crossed plies along the radially external portion of said sidewall, said layer presenting tapered extremities radially extended from the center to both its radial inner and outer ends, that is, towards the tire beads and towards the breaker structure.

In any case, the present invention will be better comprehended with the aid of the following description and the attached figures, furnished solely by way of non-limiting example, in which:

DESCRIPTION OF THE PREFERRED EMBODIMENTS

Figure 1:
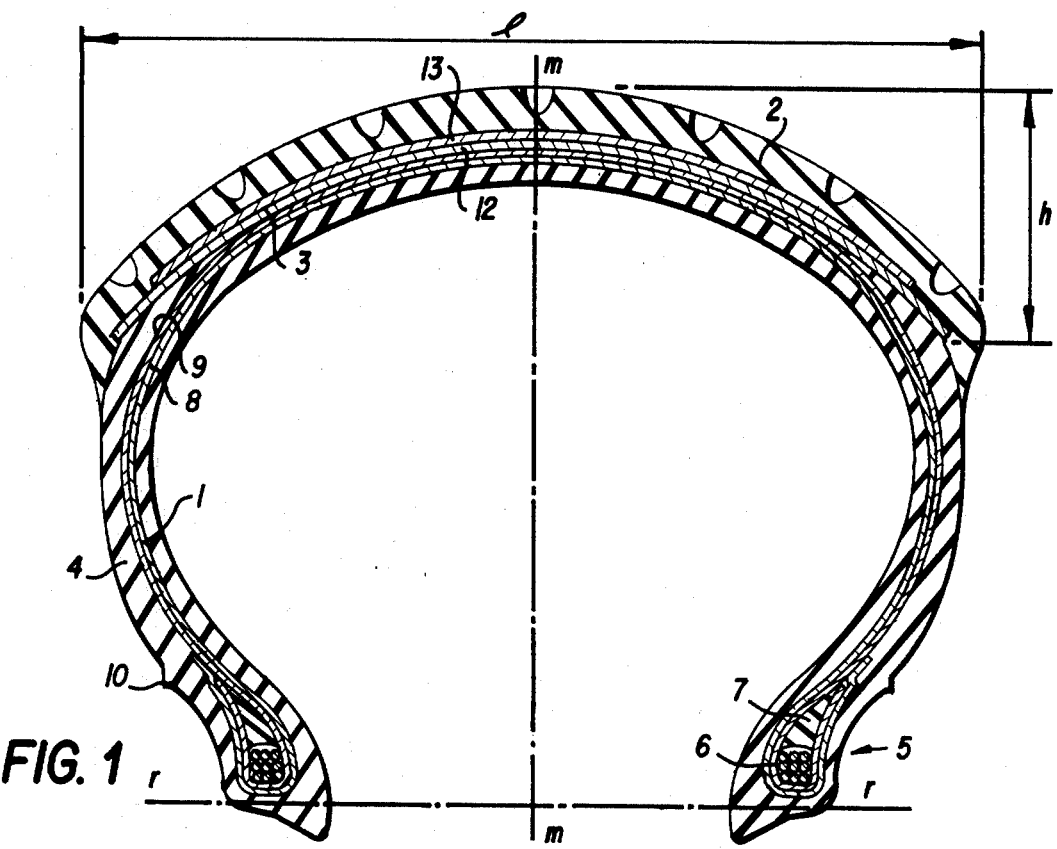
FIG. 1 illustrates a cross-section, taken parallel to the axis of rotation, of a first embodiment of the tire of this invention.

In FIG. 1, it can be noted that the tire of the invention substantially comprises a textile carcass 1, a tread band 2 disposed on the crown of said carcass, an annular reinforcing structure 3 between said tread band and said carcass, sidewalls 4, and tire beads 5 for anchoring said tire to its corresponding mounting rim.

In particular, the tire beads 5 comprise an annular reinforcing core 6, that is generally metallic and usually known as a bead core, over which there is radially disposed an elastomeric material filler 7 having a high hardness.

The carcass, in more detail, further comprises at least one pair of plies 8 and 9 extending from one bead to the other and turned up around said bead cores 6, the radial height of the turnups of the plies being rather limited; generally, it does not go beyond the limit of the mounting rim flange, conveniently shown on the tire sidewall as a slightly raised ridge 10 that serves also as a point of reference for correctly centering the tire on the mounting rim.

The cords of said plies which are parallel to one another in each ply are crossed with the cords of the adjacent plies, and symmetrically inclined with respect to the tire's mid-plane m—m, according to an angle measured on the finished tire, having a rather high value of approximately 60°, but comprised between 50° and 65°, and preferably 55° and 60°.

It is understood that these abovesaid angles are measured on the crown, astride the equatorial or mid-circumferential plane of the tire.

As far as concerns the choice of material which is most suited for the cords of the carcass plies, attention must be paid to the fact that the rubberized fabric, out of which said plies are made, must possess a modulus that is not less than 200 Kg per linear millimeter of the fabric, the value of the modulus can be governed by an opportune choice of the type of cords as well as the density of the cords in the fabric, as oriented in the order of about 100 threads/dm.

Quite conveniently, moreover, the cords of the said plies are chosen from diverse materials, depending upon the position of the plies in the structure. More precisely speaking, the cords of the axially inner ply 8 are made out of a synthetic fiber derived from cellulose, for example, of rayon, while those of the axially outer ply 9 are made of aromatic polyamide or aramid, better known under the name KEVLAR, a registered DuPont trademark.

The annular structure 3 in the crown of said carcass comprises a pair of strips 12 and 13 whose width is substantially equal to the width of the tread, and whose profile is progressively spaced away from the profile of the carcass plies towards the axial outer extremities of said structure, thus defining a "V"-shaped areas 22 under the axial outer ends of the structure 3. From now on in this text, structure 3 shall be referred to as the "belt" structure. The belt is symmetrical about the mid-circumferential plane m—m in all embodiments.

Preferably, the sidewall 4 has its radially outer portion extending into the area 22 between carcass and belt, thus creating an efficacious supporting action for the belt extremities. The cords of said strips 12 and 13, which are textile and preferably made of aromatic polyamide, i.e., of the already-mentioned KEVLAR, are parallel to one another in each strip 12 and 13, crossed with the cords of the adjacent strips and symmetrically inclined, preferably at an angle of 22°, but lying between 18° and 25°, with respect to the equatorial plane of the tire.

These angles are intended to be measured on the tire crown, astride the equatorial plane thereof.

Figure 2A:
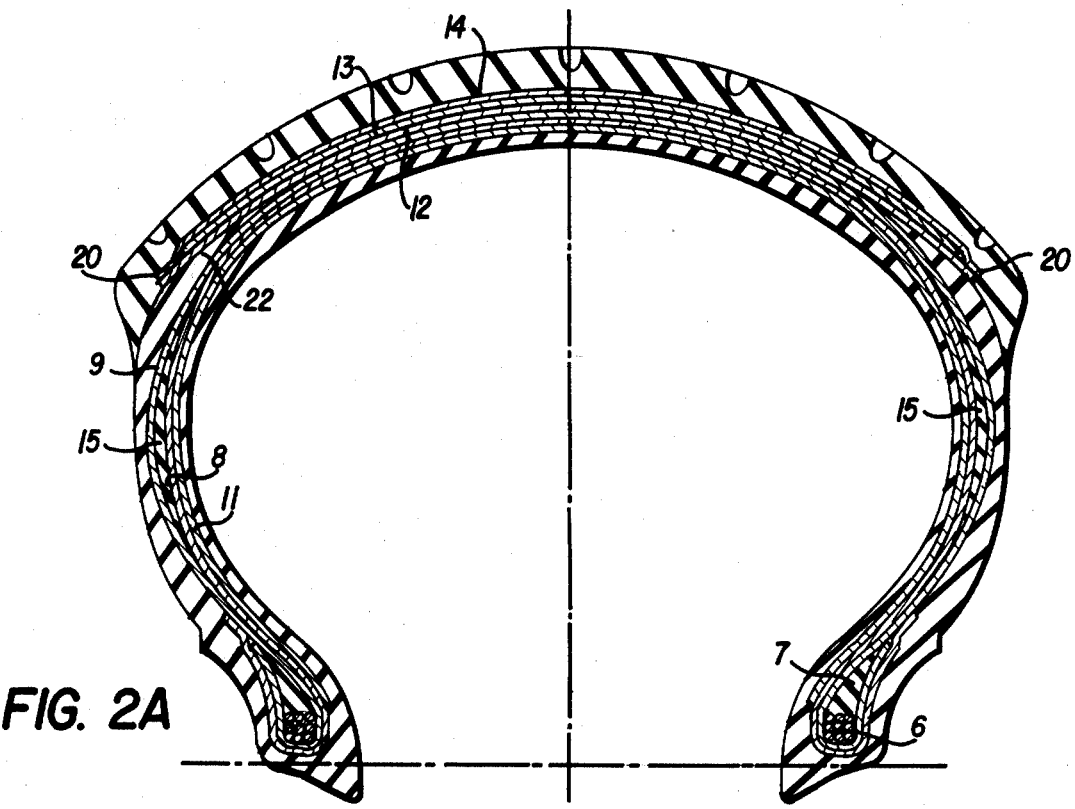
FIG. 2a is a similar cross-section which illustrates a modified version of the tire of FIG. 1.

According to a particular preferred embodiment, as seen in FIG. 2a, a further layer 14 is disposed radially outwardly and overlaps crossed-cord strips 12 and 13. Layer 14 is substantially as wide as the underlying layers (the variations in width are on the order of about the usual staggering between the edges of superimposed layers), and comprises textile cords disposed longitudinally at 0°, i.e., parallel to the equatorial plane of the tire.

The cords of said layer at 0° are preferably of polyamide, for example, of nylon.

As an alternative to the above-said layer 14, other variations are also possible; for example, the layer 14 of cords at 0° could also be substantially wider than the underlying strips of crossed cords and their extremities, i.e., those portions 20 exceeding the width of the underlying belt structure, may be turned-up axially towards the center of the tire on both axial ends of layer 14.

However, it is not necessary for the folded edge of these turnups to coincide with the edges of the underlying strips 12 and 13, since they can terminate either axially outwardly or axially inwardly with respect to the edges of strips 12 and 13.

Figure 2B:
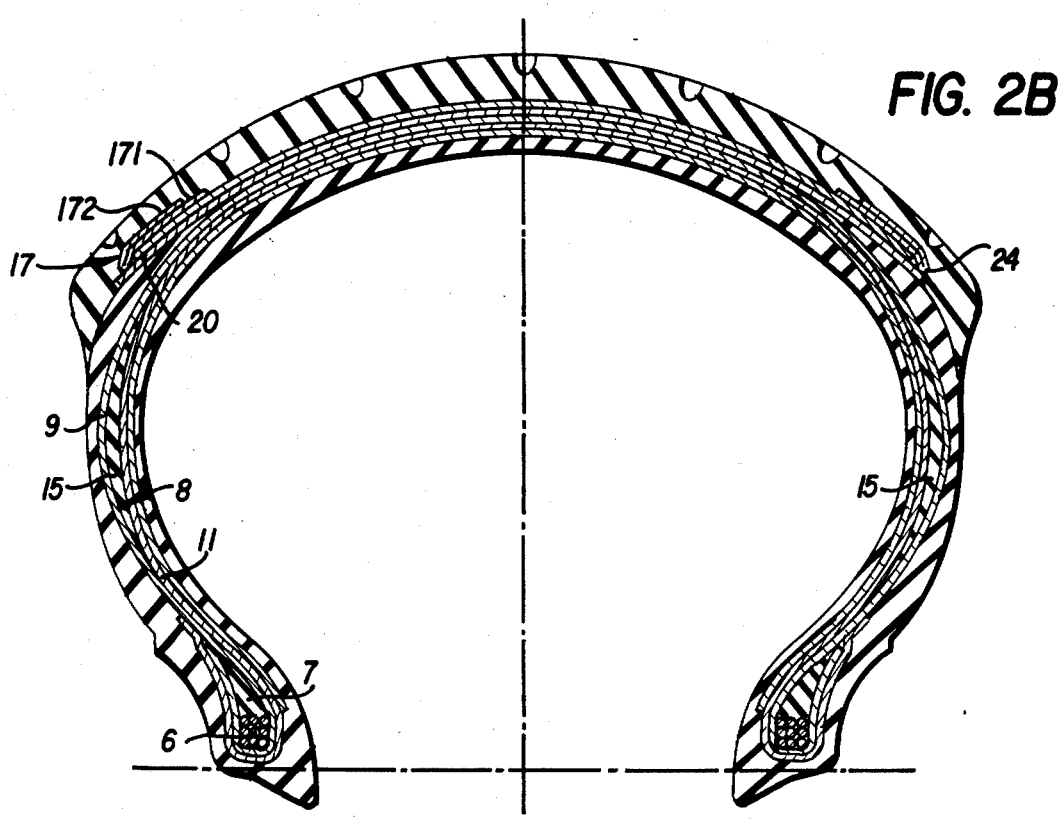
FIG. 2b is a cross-section similr to FIG. 2a, but with a modified outer layer in the tread portion.

According to another embodiment, as shown in FIG. 2b, the central portion of said layer 14 may be omitted so that the radial outer layer of the belt structure has only one winding 17, single or in several radially overlapping layers 171,172, disposed on each extremity of the pair of inclined cord strips. Preferably, the winding 17 is in the form of doubled-over strips 24, as shown in FIG. 2b, each having an axial width of about 20–30% of the axial width of the belt. The winding 17 may be made of a continuous filament wound circumferentially about the tire in side-by-side coils or may be made of a calandered multifilament strip, as is known in the tire art.

It is clear that, owing to the effect of the longitudinal orientation of the cords in the finished tire, the turnups of outer layer 17 which radially overlap the belt axial outer extremities can be considered, in the finished tire, to be the zones of a single layer in which the cords at 0° are disposed so as to have a greater density at the axial edges than at the center of said layer.

As already mentioned at the beginning of the present description, the motorcycle tire of the instant invention is particularly intended to present a tread that is comparatively much more enveloping than the tread of motorcar tires, and has a pronounced curvature in the crown; in other words, it has rounded shoulders.

In particular, said curvature is expressed here as a value of the deflection "f", i.e., the h/λ ratio, where h represents the radial height of the belt that generally coincides with that of the tread, and λ represents the maximum width of the tread, as illustrated in FIG. 1. For the tires of the invention, the value of "f" is generally comprised between 0.20 and 0.35.

The tire just described can be greatly specialized with the addition of further structural elements. According to a first variation, as shown in the sidewalls of the tire of FIGS. 2a, 2b and 3, in an axially inner position to said bundle of crossed-cord plies there is disposed at least one further ply 11, extending from one sidewall to the other sidewall of the tire, the cords of which are made of polyamid for convenience sake, for example, of nylon. These cords are disposed radially, i.e., oriented at 90° with respect to the said mid-circumferential plane m—m of the tire.

When present, said ply is not turned up around the bead cores, but, preferably, it will extend from bead heel to bead heel, terminating adjacent the radially outermost extremity of said bead cores.

Also in FIGS. 2a and 2b, there is illustrated a second preferred variation of the tire of FIG. 1.

In said variation, between the plies 8 and 9 of crossed cords in the radially outer portion of the sidewall, there is an annular elastomeric material profile 15, having a lenticular cross-section, with its radial inner and outer extremities tapered, extending radially towards the bead heels and towards the belt extremity. The thickness of said profile is preferably between one to six times the thickness of the carcass plies. And so, also, the hardness of the elastomeric material out of which the profile is made can vary within ample limits, for example, between 40° and 90° of Shore-A hardness.

The advantages of this profile 15 are multiple. Among these, as the chief advantages, there is a greater stiffness conferred to the sidewall without, however, compromising its flexibility and riding comfort; this results in the maintenance, even under tedious conditions of use, of an optimal profile for the carcass plies, so reducing the strains and wearing-out of the cords in the said plies, and the increased capacity of the tire to be self-supporting.

It must also be stressed that the usage of said profile in the tires of the invention has been made possible only after the adoption of a well-defined, limited and critical field of variability for the angles of the crossed cords in the carcass plies and, precisely, in the previously cited range. In fact, in the tires of the state of the art, the insertion of this profile 15 between the carcass plies 8 and 9 would cause distortions in the geometry of the cords and unbalanced systems of strains in the plies, owing to the effects of the reciprocal de-coupling between said plies due to the thickness of the profile, with generating ruinous effects in the tire behavior during use.

Figure 3:
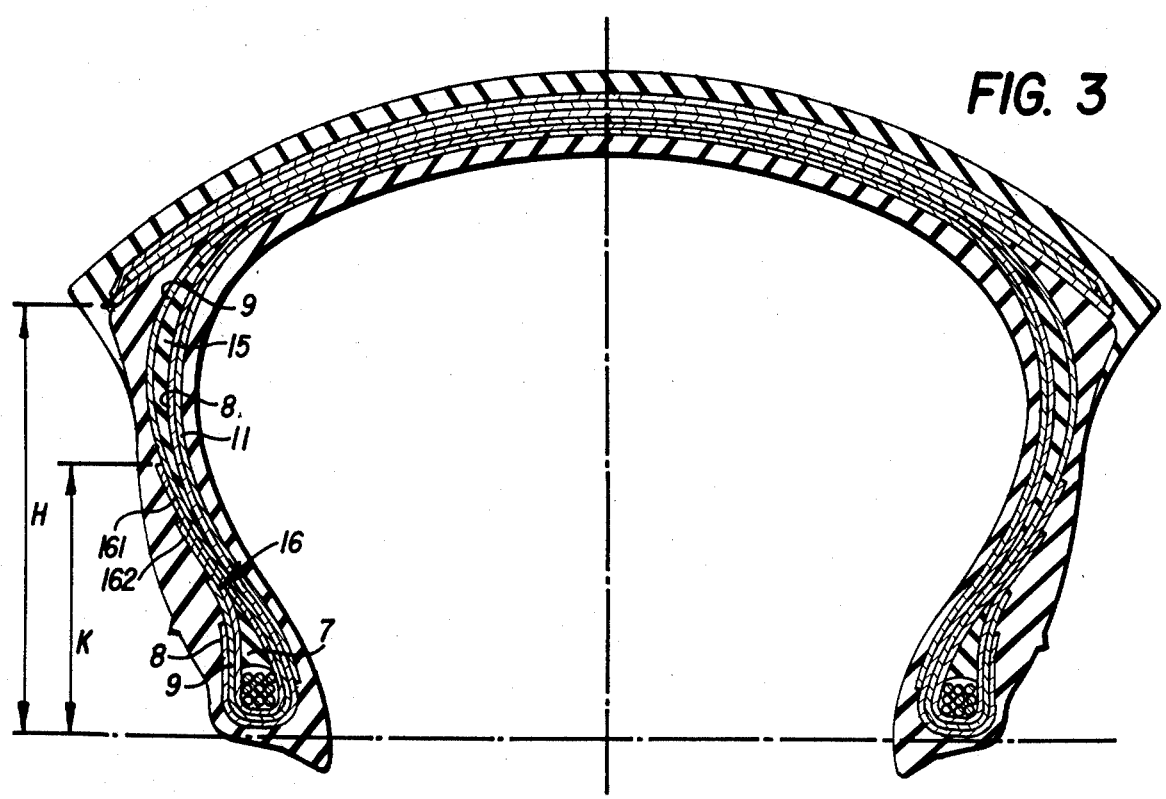
FIG. 3 is another cross-section which illustrates a further variation of the tire of FIG. 1.

FIG. 3 illustrates, also in cross-section, another embodiment of the tire of the invention that proves to be particularly advantageous whenever the tire is utilized for sports and racing events, and especially for public events.

It can be noted that, for such usage, the radially outer profile of the tread has also been conveniently modified with respect to the version normally used, i.e., it is shaped to have a sharp corner at its extremities, for allowing the driver, before he actually loses control of the vehicle itself, to appreciate the fact that the angle of inclination of the vehicle, i.e., the camber angle, has reached the maximum value admissible.

Apart from the above-said modifications, in this further variation, the tire bead has been conveniently stiffened through the means of a loop 16, made of a strip of aromatic polyamid cords, for convenience sake of KEVLAR, wound around said bead core and said filler.

The two legs 161 and 162 of the loop 16 are of differing lengths, so as to have their ends located at two diverse heights along the radial height of the sidewall and, however, at a height that is greater than that of the turnups of the carcass plies 8 and 9. Moreover, the cords of the strip of loop 16, as disposed in the two legs 161 and 162, are symmetrically inclined with respect to the radial direction, at an angle of about 45°, that is, comprised between 40° and 50°.

According to a preferred variation, the radially more extended leg, which can be the one 161 in the axially innermost position, as in FIG. 3, but could also be the one 162 in the axially outer position has its extremity at a radial height k which lies between 65% and 35% of the radial height of the tire sidewall, and preferably, where possible, it overlaps by a distance of not less than the usual staggering, usually 5 mm, the radially inner extremity of the annular profile 15.

The term "height of the sidewall" is intended to mean the radial height H of the portion between the base heel (line r in FIG. 1) and the belt extremity (see FIG. 3).

In any case, it must be observed that the variations just described, both the one relative to the radial ply 11 and the one regarding the annular profile 15, and so also the one relative to the loop 16, are not expressly connected to any specific usage, for example, sports, but they are accessory characteristics, in relation to FIG. 1, which can exist either independently one from the other or even coexist, as in the case illustrated in FIG. 3.

The tire of the invention has shown itself to have a notable series of advantages with respect to the known tires of the state of the art, that is those having a crossed-ply carcass.

In particular, it possesses a greater lateral stability that eliminates the well-known "oscillations" of the vehicle rounding a curve, a greater circumferential stiffness which allows for the transmission of greater acceleration and deceleration torques, a greater shear stiffness which allows, among other things, for traveling in curves with camber angles having a higher value than those normally utilized, and hence with less drift, with all the road-gripping advantages and also a greater driving precision than is usual, even at high speeds.

The reason it has been possible to achieve such results are not to be attributed certainly to one characteristic rather than to another, but the applicant believes, without wishing by this to in any way limit what concerns the invention, that they are due to the sum total of circumstances that are linked together. In particular, the use of angles, which are very high for the pair of crossed cord plies and comprised in a well-defined range of values, has allowed for the said plies to work disjointedly between themselves in an orthotropal manner, and not with the need for having any reciprocal connection, as would be the case if the angle of inclination for the cords, with respect to the mid-circumferential plane of the tire, had a value less than that of the above-defined range of critical limits.

On the contrary, it has already been stated that, but for those angles having values higher than the critical limit, the tire would manifest the unacceptable phenomenon of having lateral instability during straightaway running.

As already mentioned, this de-coupling has permitted the usage of diverse materials for the cords of said plies, for example, already known rayon and KEVLAR cords, as well as inserting an elastomeric material profile 15 between plies 8 and 9. All these provisions are not realizable with the usual crossed-ply tires of the state of the art, because they would suffer a decrease in their qualitative behavior characteristics.

So also the high value of the angle of said crossed plies allows probably for the annular reinforcing structure, placed in the carcass crown, to carry on to a maximum degree its positive effect, so that the tire of the invention has proved to sum up both the structural excellence of the tires having a crossed-ply carcass as well as the behavior qualities of the radial structures, with obviating the respective defects which, on the contrary, are connected with the known tires and which are even an impediment for adopting the purely radial structures in this type of tire.

In particular, when used for public sports on race tracks, the tire of the invention has permitted using higher straightaway speed and a greater acceleration and deceleration during curving with high camber values, and thus obtaining a time-saving in the order of about a half-second every kilometer travelled.

An aspect that is of less importance, but not negligible, is that all of the above-said advantages have been obtained without sacrificing the riding comfort with respect to the known tires, and such a characteristic is quite desirable for long traveling on normal roads and with tire structures that are lighter with respect to the usual structures.

It has to be understood that the present description is solely by way of non-limiting example, the scope of protection being defined by the following claims.

What is claimed is:

1. A tire for a motor-cycle wheel, comprising a two ply textile carcass with a deflection between 0.20 and 0.35, a tread band on the crown of said carcass; an annular belt reinforcing structure between said carcass and said tread band; a pair of sidewalls extending radially inwardly from said tread band, each terminating in a tire bead, each bead comprising a circumferentially inextensible annular reinforcing core;

said carcass comprising two plies of textile reinforcement each ply having a plurality of cords lying parallel to each other, with their opposite ends turned-up around the bead cores the cords of said two plies lying at equal and opposite angles to the mid-circumferential plane of the tire, at an angle of between 50° and 65°;

each sidewall including an annular elastomeric element which is substantially lenticular in cross-section and which is located between said two textile carcass plies in the radially outer portion of each tire sidewall, said lenticular elements having tapered radial inner and outer extremities extending toward the bead and toward the annular belt; the reinforcing cords of the axially innermost ply being of synthetic fibers made from cellulose and the reinforcing cords of the axially outermost ply being of aromatic polyamide.

2. The tire of claim 1, in which the angle of inclination of the reinforcing cords of said two textile carcass plies, with respect to the mid-circumferential plane of the tire is not less than 55° and not greater than 60°.

3. The tire of claim 1, in which the carcass comprises a further ply disposed in an axially inner position with respect to said two textile carcass plies and extending from bead to bead, the reinforcing cords of said further ply being made of a polyamide.

4. The tire of claim 3, in which the maximum thickness of said lenticular annular elastomeric element is from one to six times the thickness of the said carcass plies.

5. The tire of claim 1, in which said carcass includes, in the beads, a bead reinforcing element comprising a strip of textile cords having a bight portion adjacent to the radially inner part of said core and a leg on each side of the core, said legs being of differing lengths and extending radially outwardly to beyond the turned up ends of cords of said carcass plies, at least one leg of said bead reinforcing element overlapping said tapered radially inwardly directed inner extremity of said annular elastomeric element.

6. The tire of claim 5, in which the end of the radially longest leg of said bead reinforcing element is located at a point from 65% to 35% of the radial height of the tire sidewall.

7. The tire of claim 5, in which the cords of the said bead reinforcing element are made of aromatic polyamide and are inclined with respect to the radial direction of the tire at an angle of 40° to 50°.

8. The tire of claim 1, in which said annular belt reinforcing structure comprises at least two strips, each having a plurality of parallel cords with the cords of adjacent strips lying at equal and opposite angles to the mid-circumferential plane of the tire at an angle of between 18° and 25°, the cords of said strips being of aromatic polyamide, and a further layer of circumferentially extending polyamide cords lying radially outside said strips.

* * * * *